US008871658B2

(12) United States Patent
van Heerden

(10) Patent No.: US 8,871,658 B2
(45) Date of Patent: Oct. 28, 2014

(54) RIGID BALLISTIC COMPOSITES MADE FROM POLY-PARA-PHENYLENE TEREPHTHALAMIDE FIBERS HAVING LARGE DENIER PER FILAMENT

(75) Inventor: Jason Aaron van Heerden, Cambridge (CA)

(73) Assignee: Barrday Inc., Cambridge (CA)

( * ) Notice: Subject to any disclaimer, the term of this patent is extended or adjusted under 35 U.S.C. 154(b) by 500 days.

(21) Appl. No.: 12/763,678

(22) Filed: Apr. 20, 2010

(65) Prior Publication Data

US 2011/0023695 A1    Feb. 3, 2011

Related U.S. Application Data

(60) Provisional application No. 61/170,820, filed on Apr. 20, 2009.

(51) Int. Cl.
| | |
|---|---|
| *F41H 5/00* | (2006.01) |
| *F41H 5/04* | (2006.01) |
| *B32B 5/26* | (2006.01) |
| *B64D 7/00* | (2006.01) |
| *B63B 3/10* | (2006.01) |
| *B63G 9/00* | (2006.01) |

(52) U.S. Cl.
CPC ............... *F41H 5/0485* (2013.01); *B64D 7/00* (2013.01); *B63B 3/10* (2013.01); *B63G 9/00* (2013.01); *F41H 5/0471* (2013.01)
USPC ............................................... 442/134; 2/2.5

(58) Field of Classification Search
CPC ............ B32B 27/34; B32B 2262/0261; B32B 2307/732; F41H 1/00; F41H 1/02; F41H 1/04; F41H 5/00; F41H 5/04; F41H 5/0471
USPC ............ 442/135, 134; 428/911, 98, 102, 105, 428/107, 109, 113, 114, 119, 220, 364, 428/365; 89/36.02, 903, 921, 922, 930; 2/1, 2/2.5, 455, 906, 909
See application file for complete search history.

(56) References Cited

U.S. PATENT DOCUMENTS

| | | | |
|---|---|---|---|
| 3,600,269 A | | 8/1971 | Daniels et al. |
| 4,457,985 A | * | 7/1984 | Harpell et al. ................ 442/301 |
| 4,695,509 A | | 9/1987 | Cordova et al. |
| 5,545,455 A | | 8/1996 | Prevorsek et al. |
| 5,552,208 A | | 9/1996 | Lin et al. |
| 5,591,933 A | | 1/1997 | Li et al. |
| 5,635,288 A | | 6/1997 | Park |
| 5,690,526 A | | 11/1997 | Lin et al. |
| 5,935,678 A | | 8/1999 | Park |
| 7,148,162 B2 | | 12/2006 | Park et al. |
| 7,845,265 B1 | * | 12/2010 | Park et al. ..................... 89/36.02 |
| 2003/0022583 A1 | | 1/2003 | Thomas et al. |
| 2005/0066805 A1 | | 3/2005 | Park et al. |
| 2005/0197020 A1 | | 9/2005 | Park et al. |
| 2006/0030226 A1 | | 2/2006 | Park et al. |
| 2008/0006145 A1 | | 1/2008 | Park et al. |
| 2009/0260512 A1 | | 10/2009 | Park et al. |
| 2010/0015391 A1 | | 1/2010 | Beugels et al. |
| 2011/0005379 A1 | * | 1/2011 | Wang et al. ................... 89/36.02 |

FOREIGN PATENT DOCUMENTS

| | | |
|---|---|---|
| EP | 0229929 | 7/1987 |
| EP | 0572965 A1 | 12/1993 |
| EP | 1517112 A1 | 3/2005 |
| WO | 91/06823 A2 | 5/1991 |
| WO | WO9819131 | 9/1993 |
| WO | WO9320400 | 10/1993 |
| WO | 2007/122000 A1 | 11/2007 |
| WO | WO2007/145673 | 12/2007 |
| WO | 2010/121373 A1 | 10/2010 |

OTHER PUBLICATIONS

Slugin et al. "Rusar Microfilament Yarn for Ballistic Protection". Fibre Chemistry, vol. 38, No. 1, 2006, p. 22.*
Technical Guide: Kevlar Aramid Fiber, accessed Aug. 2012, p. II-1.*
Polymers: A Property Database (CHEMnetBASE) http://www.polymersdatabase.com/entry.do?id=1343&exno=1343 &method=view&si=POLY PAR; accessed Aug. 16, 2012.*
Polymers: A Property Database (CHEMnetBASE) http://www.polymersdatabase.com/entry.do?id=1213&exno=1213 &method=view&si=POLY UHMWPE; accessed Aug. 16, 2012.*
Polymers: A Property Database (CHEMnetBASE) http://www.polymersdatabase.com/entry.do?id=505&exno=505&method=yiew &si=POLY PBO; accessed Aug. 16, 2012.*
Polymers: A Property Database (CHEMnetBASE) http://www.polymersdatabase.com/entry.do?id=338&exno=338&method=yiew &si=POLY PIPD; accessed Aug. 16, 2012.*
Polymers: A Property Database (CHEMnetBASE) http://www.polymersdatabase.com/entry.do?id=1208&exno=1208 &method=yiew&si=POLY polyethylene; accessed Aug. 16, 2012.*
International Preliminary Report on Patentability issued Oct. 25, 2011 in respect of International Application No. PCT/CA2010/000600.
Extended European Search Report issued Apr. 8, 2014 in respect of European Patent Application No. 10766559.8.
Ballistic Response of Hard and Soft Panels Including InnegraTM S Fibers <http://www.innegrity.com/mydocuments/ballisticinnegras080312_2.pdf>, Nov. 30, 2009.
Beers, D.E., et al., Vectran High-performance Fibre, J. Text. Inst., vol. 81, Issue 4, 1990, pp. 561-574, The Textile Institute.

(Continued)

*Primary Examiner* — Arti Singh-Pandey

(74) *Attorney, Agent, or Firm* — Bereskin & Parr LLP/S.E.N.C.R.L., s.r.l.

(57) ABSTRACT

According to some embodiments, there is provided a ballistic-resistant composite including a plurality of large denier per filament (dpf) yarns. The large dpf yarns may have a "Composite-Armor dpf factor" (CA•dpf) of greater than or equal to 6.9.

15 Claims, 8 Drawing Sheets

(56) References Cited

OTHER PUBLICATIONS

Wilusz, Eugene (editor), Military textiles, 2008, pp. 23-29 and 238-239, Woodhead Publishing Limited in association with The Textile Institute.
Ray, Rebecca, The influence of low melt point, high modulus fibers in blended fiber ballistic resistant nonwovens, Thesis, 2006, Auburn University.
Smith, William, C., An overview of protective clothing—markets, materials, needs, 1999, Industrial Textile Associates.
Vectran Fibres Hautes Perfrormances en Polymere a cristaux liquides, Societe Francaise Hoechst, 1992.
PIPD, <www.polymersdatabase.com>, 2012.
Poly(4-hydroxybenzoate-co-6-hydroxy-2-napthalenecaboxylate, <www.polymersdatabase.com>, 2012.
Poly(p-phenylene-2,6-benzobisoxazole), <www.polymersdatabase.com>, 2012.
Polyethylene, <www.polymersdatabase.com>, 2012.
Slugin, I.V., et al., Rusar microfilament yarn for ballistic protection, Fibre Chemistry, 38, 1, 2006, pp. 22-24, Kluwer.
Ultra high molecular weight PE, <www.polymersdatabase.com>, 2012.
Honeywell Spectra Fiber, <www.honeywell-advancedfibersandcomposites.com>, 2013.
Gabara, Vodek, et al., Handbook of Fiber Chemistry, Third Edition, Chapter 13, Aramid Fibers, 2006, pp. 975-1029, CRC Press.
Wilusz, Eugene (editor), Military textiles, 2008, pp. 16-48, Woodhead Publishing Limited in association with the Textile Institute.
Kevlar aramid fiber technical guide, DuPont, Dec. 1992.
Vectran Grasp the World of Tomorrow Engineering Data, Celanese Acetate LLC, 2000.

* cited by examiner

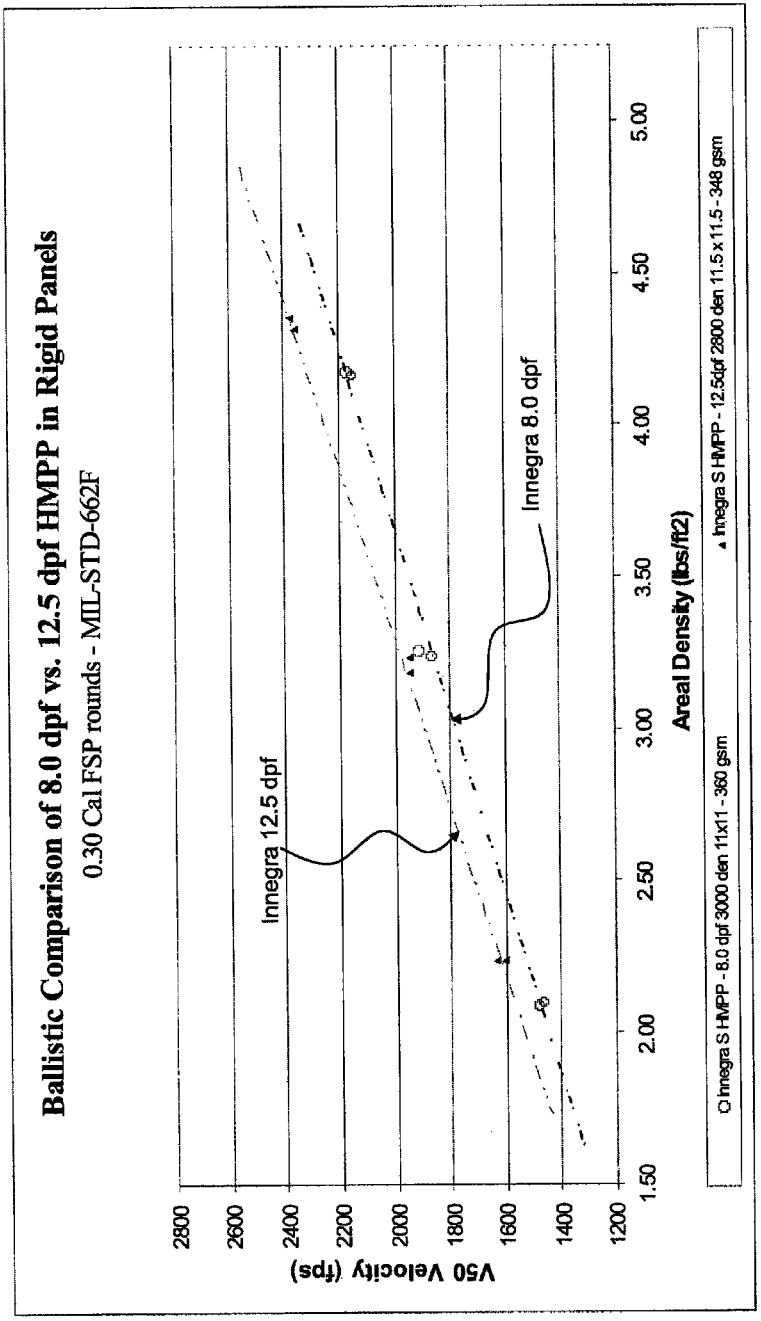

RIGID BALLISTIC COMPOSITES MADE FROM POLY-PARA-PHENYLENE TEREPHTHALAMIDE FIBERS HAVING LARGE DENIER PER FILAMENT

RELATED APPLICATIONS

This application claims the benefit of U.S. Provisional Patent Application No. 61/170,820, filed Apr. 20, 2009 and entitled "Improved Ballistic Composites Having Large Denier Per Filament High Performance Yarns", the entire contents of which are incorporated herein by reference for all purposes.

TECHNICAL FIELD

The embodiments disclosed herein relate to ballistic-resistant composites, and in particular to ballistic-resistant composites that use fibers or filaments with large denier per filament (dpf) ratios.

INTRODUCTION

There is currently a great demand for rigid or semi-rigid composite armor systems that are lightweight, inexpensive and offer improvements in ballistic performance. To meet this demand composite armor systems utilizing high performance yarns, such as aramids (e.g. Kevlar®, Twaron®, Heracron®), UHMWPE (e.g. Spectra®, Dyneema™) HMPP (e.g. Innegra™), polypropylene, polyester, Nylon, PBO, Vectran®, S-2 Glass®, Basalt, M5 fiber, carbon, etc., are increasingly being used in combination with thermoplastic and thermoset resin systems.

Traditionally, better ballistic performance, particularly in soft armor outer-tactical vests, has been achieved through the use of finer or smaller dtex yarns and finer or smaller denier per filament (dpf) yarns, which have been found to be efficient in dissipating the energy from a high-speed ballistic projectile. In addition, ballistic performance improvements have been achieved through the use of high performance yarns that have been specifically engineered to have higher tensile strength, higher initial modulus, and/or increased % elongation to break. However, these solutions typically result in a more expensive input yarn and hence significantly more expensive armor products.

Relatively little work has been done in the field of correlating dpf and ballistic performance in rigid armor due to a number of factors: a) it is typically very costly and complicated to produce identical denier yarns at different dpfs for experimental testing, b) the number of filaments and dpf of many ballistic yarns are also often kept confidential by the companies producing the yarns, and c) historically, armor manufacturers have had limited knowledge of textiles and how high-performance yarns are made.

Park et al (US 2008/0006145) discloses a hard armor composite that includes a rigid facing and a ballistic fabric backing. Park discloses the use of low dpf fibers including Twaron® of 1.5 dpf and lower, Spectra Shield® PCR of less than 5.4 dpf, Dyneema® Unidirectional (UD) fiber of less than 2.0 dpf, PBO Zylon® of 1.5 dpf or lower, and aramid Kevlar® of 1.5 dpf. The preferred embodiments taught by Park uses high-performance fibers having less than 5.4 dpf, more preferably, less than 2.0 dpf, and most preferably, less than 1.5 dpf.

SUMMARY

Embodiments described herein relate generally to the use of large dpf fibers or filaments in rigid or semi-rigid ballistic-resistant composites. According to one aspect, there is provided a ballistic-resistant composite comprising organic high-performance fibers and a resin or laminate, such as a thermoplastic ballistic film.

In some embodiments, the ballistic-resistant composites as described herein may also be useful as blast-resistant composites.

Generally, some embodiments include a ballistic resistant composite having an organic high-performance fiber or filament and exhibit greater ballistic performance with increasing dpf of the fiber or filament.

The ballistic-resistant composites disclosed herein are believed to have at least some of the following advantages:

Provide comparatively lower priced armor systems through the use of lower cost input yarn to produce the composite armor.

Provide equivalent weight ballistic panels, helmets, armor, or other composite members, etc. with improved ballistic performance (i.e. armor with a higher $V_{50}$ performance than a comparable weight armor made from smaller dpf yarn).

Provide lighter weight ballistic panels, helmets, armor or other member, etc. with the same ballistic $V_{50}$ performance as heavier armor systems.

Provide new ballistic markets and applications for large dpf high performance yarns.

Provide better performing ceramic armor backing systems (e.g. weight/cost/performance) than currently available systems.

Make effective use of lower cost, organic high performance synthetic yarns (HMPP, Nylon, PET, PP, etc.) in composite rigid or semi-rigid armor systems produced with large dpf yarn.

According to one aspect there is provided a ballistic-resistant composite comprising a plurality of large denier per filament (dpf) yarns. The large dpf yarns may have a "Composite-Armor dpf factor" (CA•dpf) selected to provide improved ballistic performance, wherein CA•dpf is determined according to the following equation:

$$CA \cdot dpf_{factor} = \frac{dpf_{yarn}}{\left(\frac{1}{(density_{yarn})^3}\right)} = dpf_{yarn} \times (density_{yarn})^3$$

The large dpf yarns may have a CA•dpf greater than or equal to 6.9.

The large dpf yarns may include aramid fibers having a CA•dpf of greater than 6.72. The large dpf yarns may include modified para-aramid fibers having a CA•dpf of greater than 3.49. The large dpf yarns may include polyester polyarylate fibers having a CA•dpf of greater than 6.86. The large dpf yarns may include HMPP fibers having a CA•dpf of greater than 4.74 based on measured density of the yarns. The large dpf yarns may include HMPP fibers having a CA•dpf of greater than 6.03. The large dpf yarns may include UHMWPE fibers having a CA•dpf of greater than 4.93. The large dpf yarns may include include PBO fibers having a CA•dpf of greater than 5.7. The large dpf yarns may include include M5 fibers having a CA•dpf of greater than 4.91. The large dpf yarns may include include carbon fibers having a CA•dpf of greater than 3.27. The large dpf yarns may include include polylolefin fibers having a CA•dpf of greater than 4.95.

The large dpf yarns may have a CA•dpf between 6.9 and 16. The large dpf yarns may have a CA•dpf between 16 and 42. The large dpf yarns may have a CA•dpf of less than 85.

The large dpf yarns may comprise aramid fibers having a dpf greater than 2.25. The large dpf yarns may comprise aramid fibers having a dpf between 2.25 and 9.5.

The large dpf yarns may comprise modified para-aramid fibers with a dpf greater than 1.1. The modified para-aramid fibers may have a dpf of between 1.1 and 8.8.

The large dpf yarns may comprise UHMWPE fibers with a dpf greater than 5.4. The UHMWPE fibers may have a dpf between 5.4 and 30.6.

The large dpf yarns may comprise polyester polyarylate fibers with a dpf of greater than 2.5. The polyester polyarylate fibers may have a dpf between 2.5 and 35.

The large dpf yarns may comprise high-performance fibers made from aliphatic (non-aromatic) polyolefins, and have a dpf of greater than 2.5. The aliphatic polyolefin fibers may include high modulus polypropylene fibers having a dpf greater than 8. The aliphatic high modulus polypropylene polyolefin fibers may have a dpf between 8 and 50.

The ballistic-resistant composite may further comprise a resin in contact with the plurality of large dpf yarns. The resin may be a thermosetting resin. The resin may be a thermoplastic resin. The resin may be selected from the group consisting of: polyesters; polypropylenes; polyurethanes; polyethers; polybutadiene; polyacrylate; copolymers of ethylene; polycarbonates; ionomers; ethylene acrylic acid (EAA) copolymers; phenolics; vinyl esters; PVB phenolics; natural rubbers; synthetic rubbers; polyethylene; and styrene-butadiene rubbers.

The plurality of large dpf yarns may include organic high-performance fibers. The plurality of large dpf yarns may include industrial fibers.

According to another aspect, there is provided a composite armor member comprising: at least one fabric layer; and a resin for securing the at least one fabric layer together; wherein the at least one fabric layer comprises a plurality of large dpf yarns.

According to yet another aspect there is provided a protective material comprising a ballistic-resistant composite that includes a plurality of large dpf fibers. The protective material may be one of: body armor; personal armor plates; personal armor shields; commercial vehicle armor; military vehicle armor; lightweight aircraft armor; ship armor; helmets; and structural armor.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 4 is a comparison of ballistic-resistant composites made with 8.0 dpf vs. 12.5 dpf HMPP (Innegra™);

DETAILED DESCRIPTION

Figure 1:
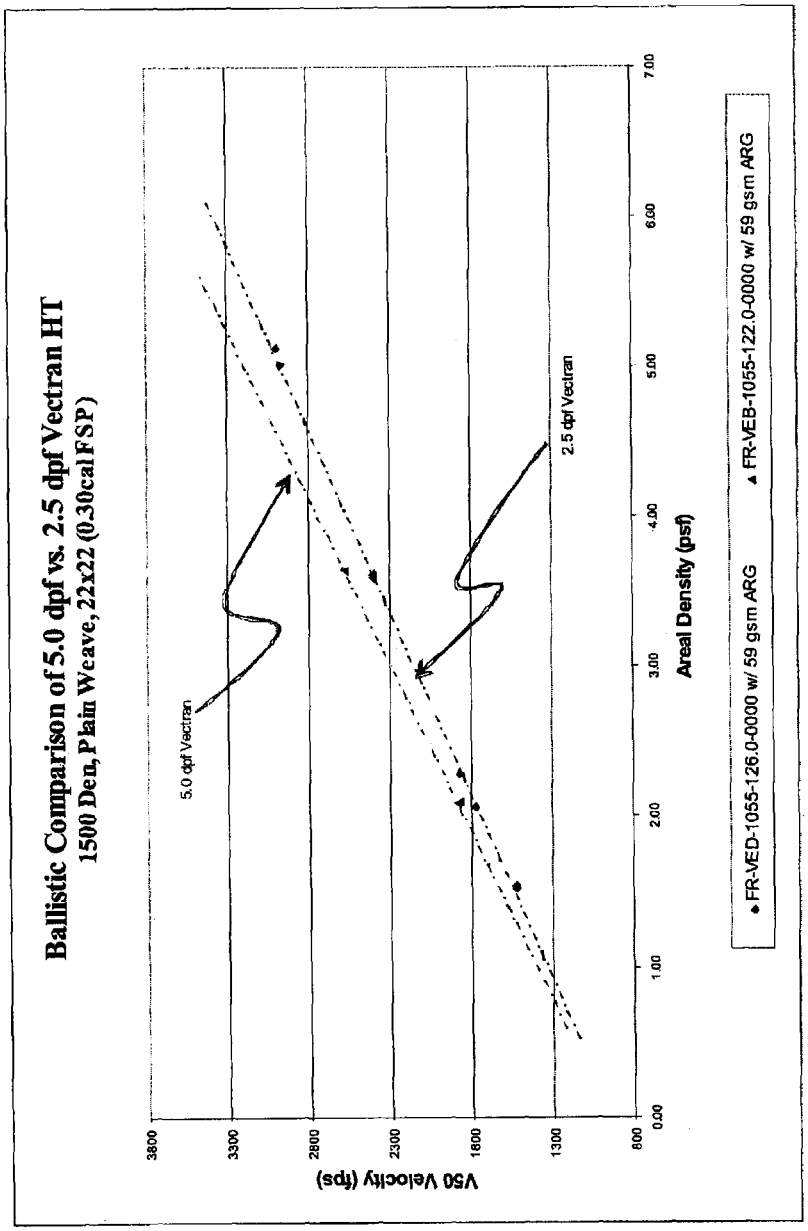
FIG. 1 is a comparison of ballistic-resistant composites made with 5.0 dpf versus 2.5 dpf Vectran® HT.

Exemplary embodiments described herein include ballistic-resistant rigid or semi-rigid composites made with high-performance fibers where increasing the dpf of the high-performance fibers improves the ballistic performance of the composite.

The inventor has surprisingly discovered that the ballistic performance of rigid or semi-rigid composites tends to improve with the use of larger dpf fibers or filaments.

The ballistic-resistant composites described herein tend to be particularly effective in composite armors where improved ballistic performance is desired at equivalent or lower raw material input costs. Some embodiments described herein include woven, unidirectional, and/or non-woven fabric/fiber matrices, and/or three-dimensional fibers matrices, consolidated into a ballistic resistant composite armor (i.e. helmets, commercial vehicle armor panels, military vehicle armor, such as spall liners, fragmentation kits, IED protection, EFP protection, lightweight aircraft armor, small arms protective inserts, protective armor for structures (e.g. buildings, military tents, etc.), armor shields, blast resistant barriers, etc.)

Fiber or Yarn Types

As used herein, the terms "fiber" or "filament" refer to an elongated body for which the length dimension is greater than the transverse or width dimension. In some embodiments, a plurality of fibers running in the same generally longitudinal direction may constitute a yarn.

As used herein, the term "denier per filament (dpf)" refers to the linear mass density of a filament expressed as the mass in grams per 9000 meters of filament.

In one aspect, the ballistic-resistant composites described herein are made from organic fibers or filaments that are known in the art of ballistic-resistant composites.

In some embodiments, the fibers are high-performance fibers such as aramid fibers, extended chain polyethylene fibers, and/or poly(p-phenylene-2,6-benzobisoxazole) (PBO) fibers. Other examples could include aramid and copolymer aramid fibers, for example as produced commercially by DuPont (Kevlar®), Teijin (Twaron®), Kolon (Heracron®), and Hyosung Aramid, aromatic heterocyclic co-polyamides also referred to herein as modified para-aramids (e.g. Rusar®, Autex®), ultra high molecular weight polyethylene (UHMWPE) produced commercially by Honeywell, DSM, and Mitsui under the trade names Spectra®, Dyneema®, and Tekmilon®, respectively (as well as Pegasus® yarn), poly(p-phenylene-2,6-benzobisoxa-zole) (PBO) (produced by Toyobo under the commercial name Zylon®), and/or polyester-polyarylate yarns (e.g. Liquid crystal polymers produced by Kuraray under the trade name Vectran®). In some embodiments, industrial fibers such as Nylon, polyester, polyolefin based yarns (including polyethylene and polypropylene), could also be used in ballistic fabrics.

In some embodiments, the ballistic-resistant composites include organic high-performance fibers made from an aromatic polyester (e.g. polyester-polyarylate) with a dpf of between 1.5 and 5. In other embodiments, the fibers may be aromatic polyester with a dpf of greater than 2.5. In other embodiment, the aromatic polyester fibers may have a dpf greater than 5. In further embodiments the aromatic polyester fibers may have a dpf between 5 and 8, between 8 and 12, between 12 and 20, or have a dpf greater than 20. In some embodiments, the high-performance aromatic polyester fibers may include Vectran™ fibers.

In other embodiments, the ballistic-resistant composite includes high-performance fibers made from an aromatic polyamide (e.g. aramid) and have a dpf between 1 and 2.25. In other embodiments, the aramid fibers may have a dpf greater than 2.25. In further embodiments, the aramid fibers may have a dpf between 2.25 and 5, between 5 and 8, between 8 and 12, between 12 and 20, or have a dpf greater than 20. In some embodiments the high-performance aromatic polyamide fibers may include Kevlar™ fibers.

In some embodiments, the ballistic-resistant composite includes high-performance fibers made from aliphatic (non-aromatic) low density polyolefins, such as ultra high-molecular weight polyethylene (UHMWPE), polypropylene, and synthetic fibers such as PET or Nylon/Amides, and have a dpf between 2.0 and 12.5. In some embodiments, the aliphatic low density polyolefin fibers may have a dpf greater than 8. In other embodiments, the aliphatic low density polyolefin fibers may have a dpf greater than 11. In further embodiments, the aliphatic low density polyolefins fibers may have a dpf greater than 12.5. In further embodiments, the aliphatic low density polyolefins fibers may have a dpf between 12.5 and 15, between 15 and 20, have a dpf greater than 20, have a dpf greater than 60, or between 60 and 100. In one embodiment the aliphatic low density polyolefins fibers may be made from Innegra™ S HMPP.

In some embodiments, the fibers may be modified para aramid (e.g. AuTex HT) with a dpf greater than 1.1. In other embodiments, the fibers may be modified para-aramid with a dpf between 1.1 and 2.2. In yet other embodiments, the fibers may be a modified para-aramid having a dpf greater than 2.2.

In some embodiments, the fibers may be UHMWPE (e.g. Spectra™ Dyneema™) with a dpf above 5.4. In other embodiments, the fibers may be UHMWPE with a dpf between 5.4 and 7.6. In yet other embodiments, the fibers may be UHMWPE with a dpf greater than 7.6.

The embodiments described herein generally do not use or substantially include fibers or yarns made from inorganic yarns, such as basalt or glass fibers. For example, ballistic composites made using small dpf S-2 glass fibers generally show better ballistic performance as compared to equivalent composites made using larger dpf S-2 glass fibers, and thus are generally not suitable for the embodiments as described herein.

Base Fabrics

According to some embodiments, the ballistic-resistant composites described herein may include fibers or yarns that are arranged into a fabric. As used herein, the term "fabric" refers to a plurality of fibers that have been arranged so as to form a generally continuous sheet and may include woven, unidirectional, and/or non-woven fabric/fiber matrices made using the organic fibers or filaments as described herein.

It will be understood that in some embodiments a particular fabric may be made from a single type of fiber, or from two or more various types of fibers. The fabric may also include various types of fibers in each yarn and/or in different yarns that are combined to make the fabric.

In some embodiments, the fabric may be woven on standard weaving looms, including rapier, shuttle, air jet, projectile and water jet looms, or on more complex weaving machines, such as three-dimensional to create multi-layer or three dimensional fabrics or weaving machines that allow cross-axial insertion.

In some embodiments the fabric is woven. However, the fabric can also be knitted or a non-woven structure. Woven fabrics may include any weave such as a plain weave, crowfoot weave, basket weave, satin weave, twill weave, proprietary weaves, or the like. The fabric may also be plied, that is, consisting of one or more layers attached together using an adhesive, thermal adhesive, stitching, matrix, or any other method known for combining layers of fabric.

Non-woven fabrics may include unidirectional fabrics, including plied unidirectional fabrics wherein the fibers of adjacent unidirectional fabric layers may be oriented to be perpendicular to one another.

Composite Materials and Resins

According to some embodiments, the ballistic-resistant composites as described herein may include one or more fabrics in contact with (and which may be secured together using) one or more resin materials, and which could be thermoplastic or thermosetting resins.

In some embodiments, the ballistic composite is a rigid or semi-rigid ballistic-resistant composite. As used herein, the term "rigid or semi-rigid" include ballistic composites comprising a fabric and a resin wherein the addition of a resin decreases axial flexural deformability of the fabric in contact with the resin.

Greige fabrics or fabrics that are not treated with a resin system are generally deformable and suitable for "soft-armor" applications. In contrast, "rigid or semi-rigid" composites are generally not deformable such that the shape of the composite may be readily altered by relative flexural movement of the fibers or filaments along their axis, as the fibers or filaments are held in place by the resin.

Generally, "rigid" may be used to refer to composites made using thermosetting resin, while "semi-rigid" may refer to composites made using thermoplastic resins and/or a low resin content of thermosetting resin.

In one embodiment, the dry-resin resin content of the ballistic composite is less than 50%. In a further embodiment, the dry-resin content of the ballistic composite is less than 30%. In some embodiments, the dry-resin content is between 5 and 20%. In some embodiments, the dry-resin content is 8% or greater.

Resins believed to be effective include appropriate formulations of polymeric materials, including thermosets or thermosetting resins and thermoplastics, such as polyesters, polypropylenes, polyurethanes, polyethers, polybutadiene, polyacrylate, copolymers of ethylene, polycarbonates, ionomers, ethylene acrylic acid (EAA) copolymers, phenolics, vinyl esters, PVB phenolics, natural rubbers, synthetic rubbers (e.g. chloroprene rubbers), styrene-butadiene rubbers, etc.

In some embodiments, the resin material may additionally include additives to control or alter the physical or chemical properties of the resin, such as nano-particles to increase toughness of the composites and/or fillers to reduce density and/or increase stiffness of the composites. In some embodiments, the resin material may also contain substances selected so as to alter the surface properties of the composite, such as, for example, dyes for coloring or the like.

In some embodiments, the fibers or fabrics as described herein are processed to form a composite material or panel. For example, the fabric may be fabricated into a prepreg using a film or a wet resin. Depending on the application, the film or resin may be applied to one side of the fabric, the fabric may be totally impregnated with a resin, and/or the film may be worked into the fabric. In some examples, two or more layers of the fabric may be laminated together to create a multi-layer fabric.

Articles made from Ballistic-Resistant Composites

In some embodiments, the ballistic-resistant composites described herein may be used in armor systems.

In some embodiments, the ballistic-resistant composites are used in the manufacture of multi-threat articles that include a stab or puncture resistant component. In some embodiments, the ballistic-resistant composites described herein may be used with ceramics or other materials suitable for stab-resistant product designs for spikes and edged weapons Finished articles that may make use of the ballistic-resistant composites include, but are not limited to, body armor, personal armor plates and shields, commercial vehicle armor, military vehicle armor, such as spall liners, fragmentation kits, IED protection, EFP protection, ship armor, helmets, structural armor, or generally any application that uses rigid or semi-rigid ballistic and/or blast resistant composites.

The above disclosure generally describes some embodiments of the present application. Further details may be obtained by reference to the following specific examples. These examples are described solely for the purpose of illustration and are not intended to limit the scope of the disclosure. In particular, changes in form and substitution of equivalents are contemplated as circumstances might suggest or render expedient. Although specific terms have been employed herein, such terms are intended in a descriptive sense and not for purposes of limitation.

EXAMPLES

Example 1

Effect of DPF on Ballistic Performance of Vectran™ Armor Systems

In order to do a "head-to-head" comparison of the effect of dpf in rigid armor panels, two substantially identical Vectran® fabrics were woven, one using 2.5 dpf, Vectran HT 1500 denier (600 filament) yarn and one using a 5.0 dpf Vectran 1500 denier (300 filament) yarn produced commercially for only non-ballistic applications. Both Vectran® yarns had similar tensile strengths (of approx 25 g/denier), moduli and % elongations to break. Both were woven in the same 22×22 plain weave construction using a Dornier rapier loom and both greige fabrics had a dry weight of 284 gsm.

Each fabric was then laminated with the same modified thermoplastic polyethylene ballistic film, having an areal density of 59 gsm, and pressed into ballistic test panels at various areal densities for evaluation. Based on the weight of the film applied, the ballistic test panels all had a DRC (dry resin content) of 17.2%.

Ballistic limit (i.e. $V_{50}$) testing was done using .30 caliber fragment simulating projectiles (FSP'S) on each of the pressed test panels as per MIL-STD-662F. From the ballistic $V_{50}$ data generated a ballistic performance curve was generated for both the 5.0 dpf Vectran HT based armor panels (FR-VEB-1055-122.0-0000 w/59 gsm ARG) and the 2.5 dpf Vectran HT based armor panels (FR-VED-1055-127.0-0000 w/59 gsm ARG). This allowed for the comparison of the two armor systems across a variety of armor weights. As shown in FIG. 1, the large 5.0 dpf, 1500 denier Vectran yarn tends to show better ballistics performance than the (more expensive) lower 2.5 dpf 1500 denier Vectran yarn.

For example, 56 layers of 2.5 dpf Vectran fabric pressed into an ballistic plate (at an areal density 3.6 psf) had an average $V_{50}$ performance of 2408 fps, while 56 layers of 5.0 dpf Vectran fabric pressed into an ballistic plate (at an areal density 3.6 psf) had an average $V_{50}$ performance of 2586 fps; a difference of 178 fps or 54 m/s.

Example 2

Effect of DPF on Ballistic Performance of Aramid Armor Systems

Standard Kevlar® 29, 3000 denier aramid yarn (an assembly of 1333 individual 2.25 dpf yarn filaments), was compared against a lower denier per filament (1.5 dpf, 2000 filament) Kevlar, 3000 denier yarn being introduced by DuPont as a potential direct replacement for the Kevlar® 29 yarn in ballistic applications. The 1.5 dpf Kevlar had the same nominal tenacity (26 g/denier), modulus and elongation to break as the 2.25 dpf Kevlar® 29 yarn.

3000 denier Kevlar@ 29 yarn is currently used extensively in numerous hard and soft armor applications including military helmets, rigid vehicle armor systems, spall-liners and blast fragmentation blankets. It is the yarn of choice for these applications both due to its performance and its price point vs. lower denier and more expensive Kevlar yarns (e.g. 200, 500, 850 and 1500 denier aramid yarns). These lower denier yarns typically are made from finer dpf yarn filaments.

As will be described in greater detail below, the inventor has discovered that DuPont 3000 denier has a calculated CA•dpf of 6.76 (as will be explained below), which is believed to be the highest currently available CA•dpf for all aramids on the market.

Figure 2:
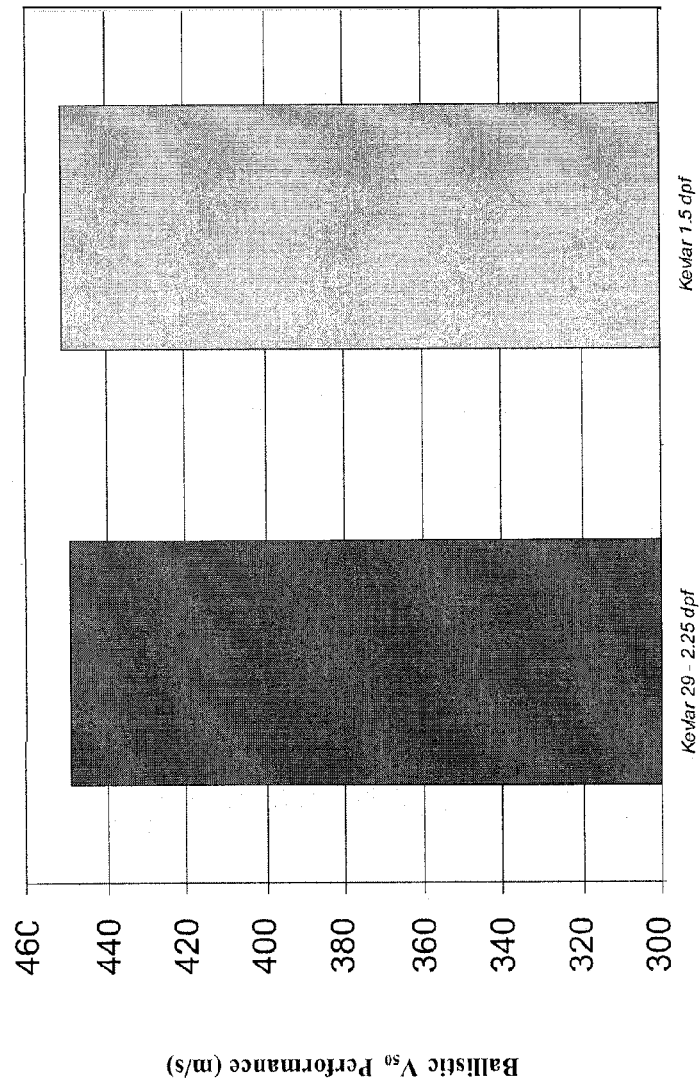
FIG. 2 is a comparison of ballistic-resistant soft-armor made with 1.5 dpf vs. 2.25 dpf Kevlar®.

To compare the performance of the 1.5 dpf Kevlar® yarn vs. the 2.25 dpf Kevlar® 29 yarn, the 1.5 dpf Kevlar was woven into an 'industry standard' 17×17, plain weave, 450 gsm fabric construction on a Dornier rapier loom. For soft armor comparison, 9 layers of this fabric was shot with 17 grain type 1 FSP's as per MIL-STD-662F and compared to the identical fabric constructed using 2.25 dpf Kevlar 29 yarn, as shown in FIG. 2. 9 layers of the 1.5 dpf fabric had an areal density of 0.9 psf and gave an average $V_{50}$ of 1481 fps. 9 layers of the standard 2.25 dpf fabric had an areal density of 0.9 psf and gave an average $V_{50}$ of 1477 fps when shot with this threat, indicating that in such a soft armor configuration the smaller dpf Kevlar was equivalent or potentially even slightly better than the standard 2.25 dpf Kevlar 29 yarn.

For a hard armor comparison, both the 1.5 dpf 17×17, 3000 denier fabric and the 2.25 dpf 17×17, 3000 denier fabric were laminated with a modified thermoplastic polyethylene film 70 gsm thermoplastic ballistic film. Both fabrics were then cut and pressed into rigid ballistic panels at nominal areal densities of 2.0, 3.0 and 4.0 psf. All panels had had a DRC of 13.5% by weight.

Figure 3:
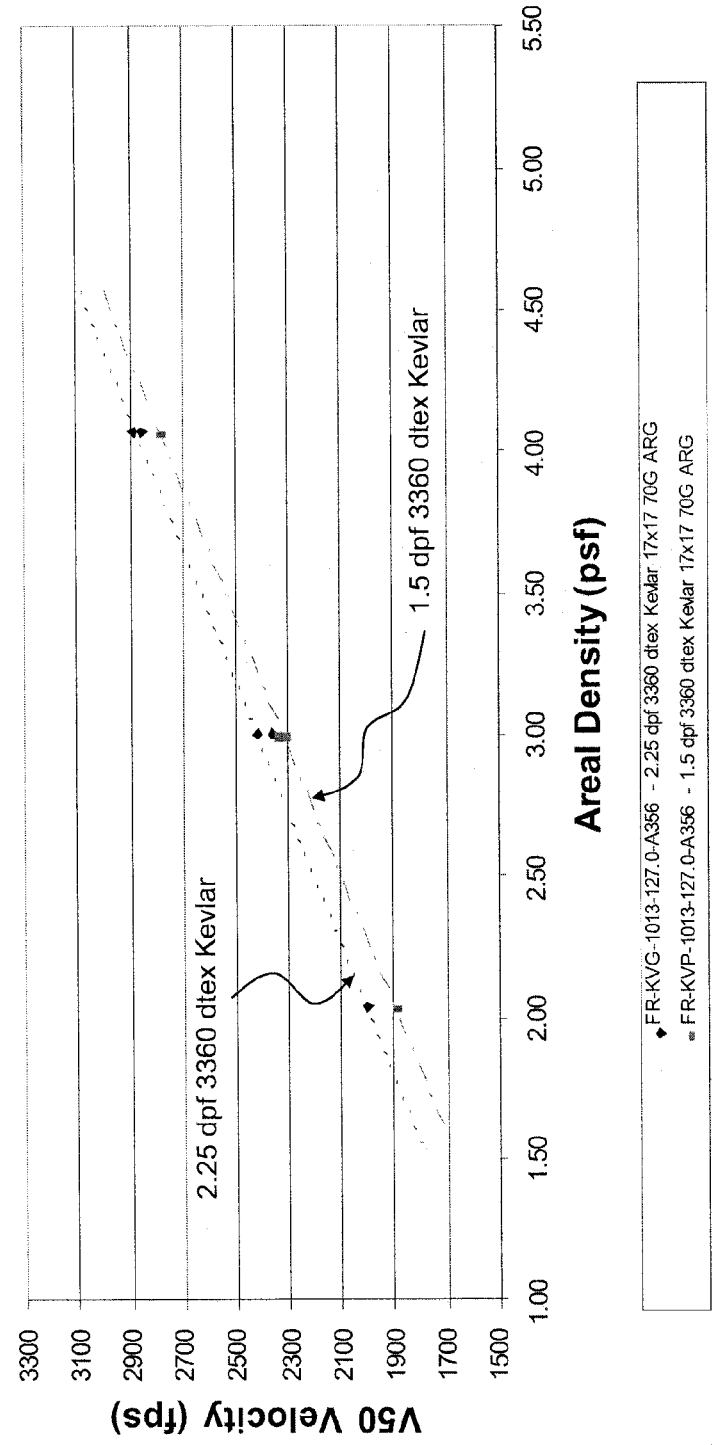
FIG. 3 is a comparison of ballistic-resistant composites made with 1.5 dpf vs. 2.25 dpf Kevlar®.

Ballistic $V_{50}$ testing was then performed on these rigid test panels using .30 caliber FSP'S as per MIL-STD-662F. Ballistic performance curves were generated from the ballistic $V_{50}$ data for both the 1.5 dpf 17×17, 3000 denier fabric and the 2.25 dpf 17×17, 3000 denier fabric. As shown in FIG. 3, this allowed for a direct comparison of the ballistic performance for the two yarn dpf's across a variety of armor weights.

As can be seen from FIG. 3, in rigid armor testing the larger 2.25 dpf, 3000 denier Kevlar® 29 yarn tended to give better ballistics per unit weight than the 1.5 dpf 3000 denier Kevlar yarn. For example, 19 layers of 2.25 dpf Kevlar® 29 fabric pressed into a 2.10 psf ballistic panel had an average $V_{50}$ performance of 2008 fps, while 19 layers of 1.5 dpf Kevlar® 29 fabric pressed into an identical 2.10 psf ballistic panel had an average $V_{50}$ performance of only 1888 fps; a difference of 120 fps or 37 m/s.

Example 3

Effect of DPF on Ballistic Performance of Low Density Polyolefin (Innegra®) Armor Systems This example investigated whether composites using relatively large dpf yarns of relatively low-density polyolefin, aliphatic (non-aromatic) organic yarns (e.g. UHMWPE, PP, PET, Nylon/Amides) would also exhibit improved ballistic performance compared to similar low dpf composites.

For this study high modulus polypropylene yarn (i.e. Innegra®) was selected due to the availability of comparable Innegra® yarns of differing denier per filament to test. The inventor believes that it is reasonable to assume that all aliphatic organic yarns would likely show a similar dpf related ballistic performance trend within a certain range of yarn filament diameters and yarn density. The range of viable ballistic yarn filament diameters would be dependent on the density and physical properties of the organic yarn selected (e.g. tensile strength, modulus, and percent elongation to break).

For this study 3000 denier 8 dpf Innegra® S HMPP yarn was compared against a developmental 2800 denier 12.5 dpf Innegra® S HMPP yarn. Ideally it would have been preferable to compare identical yarn deniers (as done with Vectran® and Kevlar® above in Examples 1 and 2), but based on the available literature and experimental testing the inventor believes it is reasonable to assume the slight denier difference between the two Innegra yarns has minimal impact on the ballistic limit of the final pressed ballistic panels.

In order to do a "head-to-head" comparison the 3000 denier 8 dpf (375 filament) Innegra® yarn was woven in an 11×11 plain weave construction using a Dornier rapier loom to give a fabric with a nominal dry weight of 302 gsm, while the 2800 denier 12.5 dpf (224 filament) Innegra® yarn was woven in an 11.5×11.5 plain weave construction using a Dornier rapier loom to give a fabric with a nominal dry weight of 298 gsm. These specific fabric constructions were chosen so as to produce as similar fabrics as possible with respect to: weight, crimp level, thickness and cover-factor. Both yarns had the same nominal tenacity of 7.8 g/den, a nominal percent elongation to break of 7.75% and nominal initial modulus of 212 grams-Force/denier.

Each of these fabrics was then finished and laminated with the same modified thermoplastic polyethylene ballistic film, having an areal density of 38 gsm, and pressed into ballistic test panels at various weights for evaluation. Based on the weight of the film applied, the ballistic test panels all had a DRC of approx 11%.

Ballistic $V_{50}$ testing was again done using .30 caliber fragment simulating projectiles (FSP'S) on each of the pressed test panels as per MIL-STD-662F. From the resulting ballistic $V_{50}$ data, a ballistic performance curve was generated (within a limited velocity range) for both the 8 dpf Innegra® yarn panels and the 12.5 dpf Innegra yarn panels to allow for direct comparison. As shown in FIG. 4, the relatively large 12.5 dpf HMPP yarn tended to out-perform the smaller, considerably more expensive 8.0 dpf HMPP yarn, for each panel weight tested.

For example, based on the equation of the lines calculated for each armor system in the above chart, the 12.5 dpf rigid Innegra panels would have a ballistic performance limit (i.e. $V_{50}$) of 2248 fps (685 m/s) at an areal density of 4.0 psf, while the 8.0 dpf rigid Innegra® panels would have a ballistic performance limit of 2106 fps (642 m/s) at the same areal density.

The performance curves shown in FIG. 4 were assumed to be linear over the range of weights and velocities tested. This assumption matches well with the experimental data but is not believed to hold true at significantly lower or significantly higher velocities where other factors may play a more significant role on the ballistic limit of the test panels. It is believed that this 142 fps ballistic limit difference between the two systems is due primarily to differences in yarn dpf, with the larger dpf yarn being more efficient in dissipating the kinetic energy of the ballistic projectile in rigid composite armor.

After this work was completed another Innegra fabric was woven but this time using an even larger specially produced 19.0 dpf (150 filament) Innegra® HMPP yarn. This was then woven in a 12.5×12.5 plain weave construction using a Dornier rapier loom to give a fabric with a nominal dry weight of 320 gsm. While this fabric was slightly heavier than the previously woven fabrics it was still quite similar to the above constructions with respect to crimp-level, thickness and cover factor. The large 19.0 dpf (150 filament) Innegra® HMPP yarn also had the same nominal tenacity of 7.8 g/den, nominal percent elongation to break of 7.75% and nominal initial modulus of 212 grams-Force/denier as the yarns used to weave the other two Innegra® HMPP fabrics.

This 19.0 dpf fabric was then finished and laminated with the same thermoplastic ballistic film having an areal density of 38 gsm, and pressed into ballistic test panels at various weights for evaluation. Based on QC testing done on this fabric, and the weight of the film applied, the ballistic test panels all had a DRC of approx 10.4%.

Ballistic V50 testing was again done using .30 caliber fragment simulating projectiles (FSP'S) on each of the test panels as per MIL-STD-662F. From the ballistic V50 data generated a ballistic performance curve was generated (within a limited velocity range) as shown in FIG. 4A.

As evident by inspection, ballistically the larger 19.0 dpf Innegra® HMPP yarn out-performed both the mid range 12.5 dpf HMPP yarn and the smaller more expensive 8.0 dpf HMPP yarn, at each panel weight tested.

For example, based on the equation of the lines calculated for each armor system in the above chart, a 4.0 psf. 19 dpf Innegra panel would have a ballistic performance limit (i.e. V50) of 2342 fps (714 m/s) as compared to 2248 fps (685 m/s) for the 12.5 dpf rigid Innegra panels as compared to 2106 fps (642 m/s) for the 8.0 dpf rigid Innegra® panel. While it is unknown what minor impact the slightly denser fabric construction may have on the ballistic performance of the 19 dpf Innegra fabric, the above testing is further strong evidence that larger dpf yarn is more efficient in dissipating the kinetic energy of ballistic projectiles in rigid composite armor.

Figure 4A:
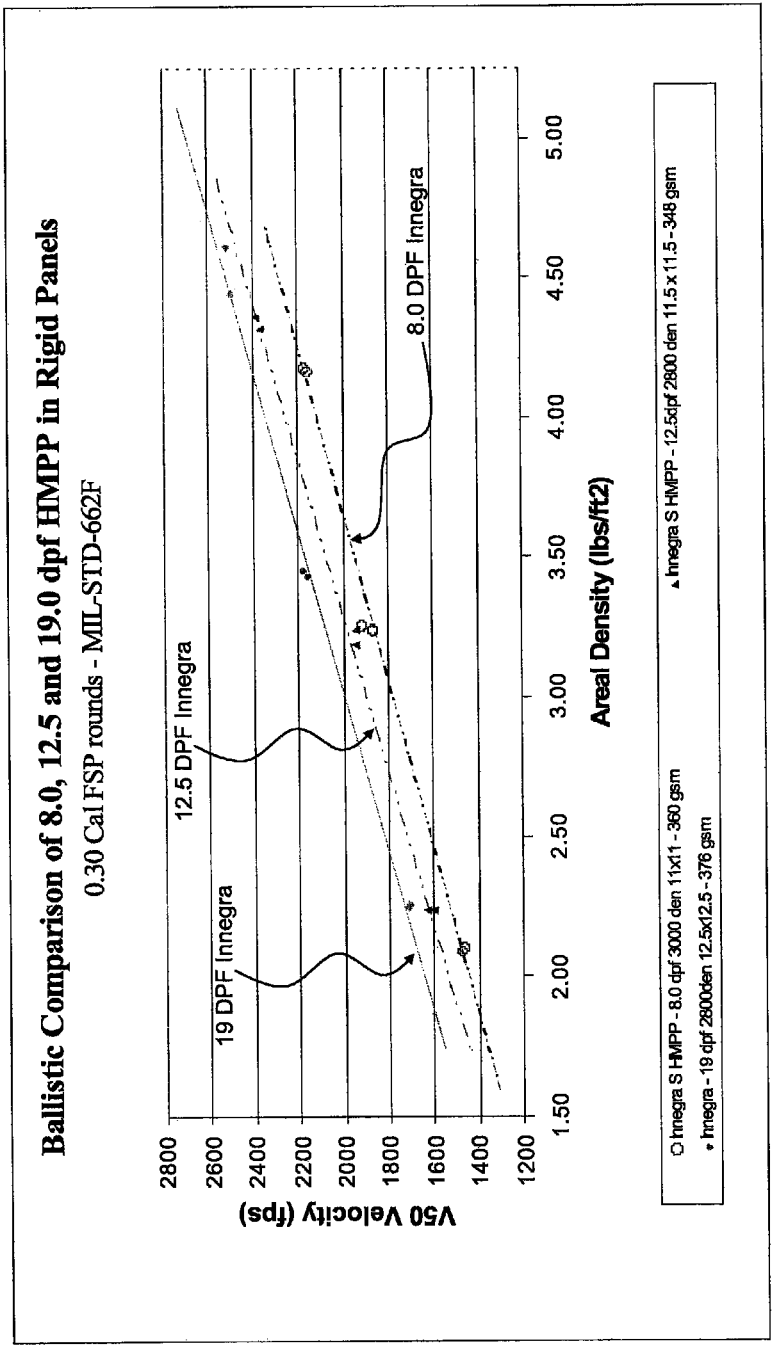
FIG. 4A is a comparison of ballistic-resistant composites made with 8.0 dpf, 12.5 dpf and 19.0 dpf HMPP (Innegra™)

Note that the performance curves shown in FIGS. 4 and 4A were assumed to be linear over the range of weights and velocities tested. This assumption matches well with the experimental data but may not hold true at significantly lower or hyper velocities where other factors may have a more significant influence on the ballistic limits of the test panels. Discussion and Mathematical Models of the Ballistic Performance of Large DPF Yarns in Rigid or Semi-Rigid Composites.

The embodiments described herein generally provide improved rigid or semi-rigid composite armor systems (e.g. lighter, better ballistic performance, less expensive) through the use of larger dpf high performance yarns.

The use of larger dpf fibers or filaments for improving ballistic performance appears counter-intuitive to what has previously been experimentally observed in soft armor systems. However, as shown in Examples 1, 2 and 3 above, ballistic testing done with three different types of synthetic (organic) high performance yarns (Kevlar, Vectran and HMPP) suggests that rigid and semi-rigid composite armor panels constructed out of larger dpf yarns outperform comparable composite ballistic panels constructed out of identical or substantially identical smaller dpf high performance yarns.

Large dpf yarn is typically simpler and less expensive to produce on a per weight basis. Therefore, by using less expensive 'large' dpf yarns in rigid or semi-rigid armor systems it may be possible to produce lighter and better performing ballistic armor that is less expensive than armor systems currently available on the market.

Without limiting the scope of the embodiments described herein, it is believed that the improved ballistic performance is a function of the yarn's total exposed surface area and how the individual yarn filaments are constrained by the resin system utilized (e.g. thermoplastic or thermosetting resin). Because a low dpf yarn has significantly more individual yarn filaments and hence more surface area than a comparable large dpf yarn, a low dpf yarn itself, on a per weight basis, tends to be in more 'intimate contact' with the rigid armor resin system and hence more 'constrained' by it.

In other words, because of the high degree of interaction between the resin and the smaller yarn's individual yarn filaments, the fibers or filaments are believed to be less efficient at transferring the longitudinal strain waves of a ballistic event along their length (for smaller dpf yarns). This inefficient transfer of the longitudinal strain waves, in conjunction with the potential reflection of these tensile waves within the yarn, increases the total tensile load acting upon the smaller dpf yarn at a specific point thereby prematurely breaking the yarn before the theoretical maximum amount of energy can be absorbed along its length.

On the other hand, larger dpf yarns, with fewer filaments and less surface area, are theoretically less constrained by the composite armor's resin system and hence are better be able to dissipate the energy of a ballistic event. For example, a 2.5 dpf, 3000 denier yarn (with a specific gravity of 1.4 g/cm$^3$) has 1200 individual yarn filaments and hence, one linear meter of this yarn would have a theoretical total surface area of 599.2 cm$^2$. In comparison, one linear meter of an identical 3000 denier yarn, at 5.0 dpf would have 600 yarn filaments and would consequently have only a theoretical surface area of 423.7 cm$^2$. This corresponds to a 30% reduction in total yarn surface area as compared to the smaller dpf yarn.

In some cases, a good ballistic fiber should have the following key properties: high strength, high strain to failure, high elastic modulus and low density. Mathematically, a yarn's theoretical ballistic performance can be modeled using Equation 1 as follows:

$$U_y = [(Y \cdot \varepsilon_f / 2\rho) \cdot \sqrt{E/\rho}]^{1/3} = [(Y \cdot \varepsilon_f / 2\rho) \cdot c]^{1/3} \qquad (1)$$

Where:
$U_y$=the theoretical ballistic performance of an 'unconstrained' yarn
Y=the yield strength of the yarn
$\varepsilon_f$=the yarn's % strain to failure
E=the yarn's elastic modulus
$\rho$=the density of the yarn
c=the sound speed of the yarn
(See Phillip M. Cunniff, Margaret A. Auerbach, High Performance "M5" fiber for Ballistics)

Equation 1 has shown good correlation to actual experimental ballistic testing.

The inventor believes that Equation 1 would also generally hold true in rigid and semi-rigid composite armor systems. However, the inventor has discovered that the effect of the resin matrix should also be taken into consideration.

Assuming that the organic ballistic yarn does the vast majority of the work in stopping a ballistic projectile within a composite armor, and ignoring transverse wave effects (which may in fact be significant) the inventor has developed Equation 2 which is believed to summarize the theoretical ballistic performance of a yarn within a resin matrix:

$$U_{yRM} = \left[ (Y \cdot \varepsilon_f / 2\rho_{yarn}) \cdot \frac{1}{2} \left( (2-a)\sqrt{E_{yarn}/\rho_{yarn}} + a\sqrt{E_{resin}/\rho_{resin}} \right) \right]^{1/3} \qquad (2)$$

Where:
$U_{yRM}$=the theoretical ballistic performance of a 'constrained yarn' within a resin matrix.
a=the % interaction between the resin matrix and the ballistic yarn in the rigid composite armor.

As can be seen from Equation 2, the yarn's ballistic performance is a function of both its own elastic modulus and density and the elastic modulus and density of the resin matrix itself. This reflects that the speed of sound through an anisotropic composite material will be some average of both the yarn's sound speed and the resin's sound speed.

Further, given the extremely high elastic moduli of ballistic yarns (e.g. ~75 GPa for Kevlar 29) relative to most standard composite resin matrices (0.2 GPa for LDPE) the inventor interprets Equation 2 to indicate that:
The resin matrix typically has a negative impact on the theoretical ballistic performance of the 'constrained' yarn; and
The 'negative impact' of the resin matrix can be minimized by reducing the % interaction between the resin matrix and the ballistic yarn in the composite armor.

The "% interaction" between the resin matrix and the yarn is generally dependent both on the level of resin encapsulation and on the microscopic mechanical/chemical interaction between the yarn's surface and the resin itself. For example, if a composite resin system 'binds' the yarn bundle but fails to individually encapsulate each of the yarn's thousands of individual yarn filaments, then the yarn may be considered not to be substantially encapsulated, and the degree of interaction relatively low. Conversely, if a strong chemical bond exists between the yarn's surface and the resin, as opposed to simply a mechanical bond, then the relative "% interaction" will tend to be greater.

% Interaction thus generally measures how well an acoustic sound wave moving through two dissimilar materials in close contact with each other would equalize between one another (e.g. between the yarn and the resin).

Equation 2 therefore provides a conceptual validation that the ballistic performance of yarn within composite armor can be improved by increasing the dpf the ballistic yarn's filaments, thereby decreasing the yarn's surface area and reducing the relative degree of interaction between resin matrix and the yarn.

This model also agrees with experimental results in aramid composite armors with respect to dry resin content (DRC). For aramid composite armors, typically the ballistic performance of the panel (i.e. its V50 ballistic limit) is inversely proportional to the DRC of the armor's resin system—i.e. the lower the DRC of the panel, the higher the panels V50 ballistic limit until a 'critical point' is reached where the ballistic panels simply break apart or delaminate excessively when impacted by a projectile due to insufficient resin.

It is also of note that inorganic ballistic glass roving (also widely used in composite armor systems) does not show this large dpf effect in composite armor. In fact, the reverse has been experimentally proven where smaller denier per filament glass yarns outperform larger dpf yarns in rigid pressed ballistic panels when impacted by either deformable or non-deformable ballistic rounds.

One possible reason for this difference is that inorganic glass yarns fail and dissipate the energy of a ballistic event in a significantly different manner than do organic high performance yarns as described herein. Accordingly, ballistic glass based armors also typically perform better the higher the DRC of the composite armor until the parasitic weight of the 'non ballistic' resin adversely impacts the V50 performance of the ballistic panel. This suggests that substantial encapsulation and bonding of the resin system with ballistic glass yarns is beneficial to performance, not detrimental.

The fact that the ballistic yarns in a composite ballistic panel are held 'rigidly' in place is another potential reason why large dpf organic yarns are believed to perform better in hard armor systems than in soft armor systems. Since the yarns in hard armor (e.g. rigid and/or semi-rigid armor) are fixed in place, they are not as easily pushed aside by a ballistic projectile impacting the composite armor. This means that the projectile is 'forced' to impact and break yarns (e.g. via tensile yarn failure), which dissipates significantly more energy than if the projectile were to largely 'push aside' the yarns within the various layers of the composite armor thus impacting and breaking only a minimum number of yarns.

However, in soft armor, where yarn and filaments are relatively unconstrained and free to move, large dpf yarn filaments would theoretically be more prone to being 'pushed aside' by a projectile than comparable smaller dpf yarn filaments.

Example 4

Further Vectran dpf Testing

To attempt to better understand the impact of dpf in rigid armor panels, determine optimum or commercially desirable yarn dpf for rigid armor panels, and determine a practical dpf range for high performance yarns in rigid armor panels, further testing was performed.

Two identical Vectran® fabrics were again woven, however this time using 5 dpf Vectran HT 3000 den yarn and a developmental very large 15 dpf, 3000 denier Vectran HT yarn specifically requested by Barrday Inc. for this research.

The 5 dpf 3000 denier Vectran HT yarn consisted of 600 individual yarn filaments bundled together and the 15 dpf 3000 denier Vectran HT yarn consisted of 200 individual yarn filaments bundled together. Both Vectran® yarns had the same nominal tenacity (23.5 cN/dtex), moduli and % elongation to break at 3.7%. Both were woven in the same 17×17 plain weave construction using a Dornier rapier loom and both greige fabrics had a dry weight of 465 gsm.

Each of the fabrics was then laminated with the same modified polyethylene thermoplastic ballistic film, having an areal density of 70 gsm, and pressed into ballistic test panels at various areal densities for evaluation. Based on the weight of the film applied, the ballistic test panels all had a DRC of 13.1%.

Ballistic limit (i.e. V50) testing was again done using .30 caliber fragment simulating projectiles (FSP'S) on each of the test panels made as per MIL-STD-662F. From the ballistic V50 data generated a ballistic performance curve was generated for both the 5.0 dpf Vectran HT based armor panels (FR-VEB-1013-127.0-1139) and the 15 dpf Vectran HT based armor panels (FR-VEF-1013-127.0-1139). This allowed for the comparison of the two armor systems across a variety of armor weights.

Figure 5:
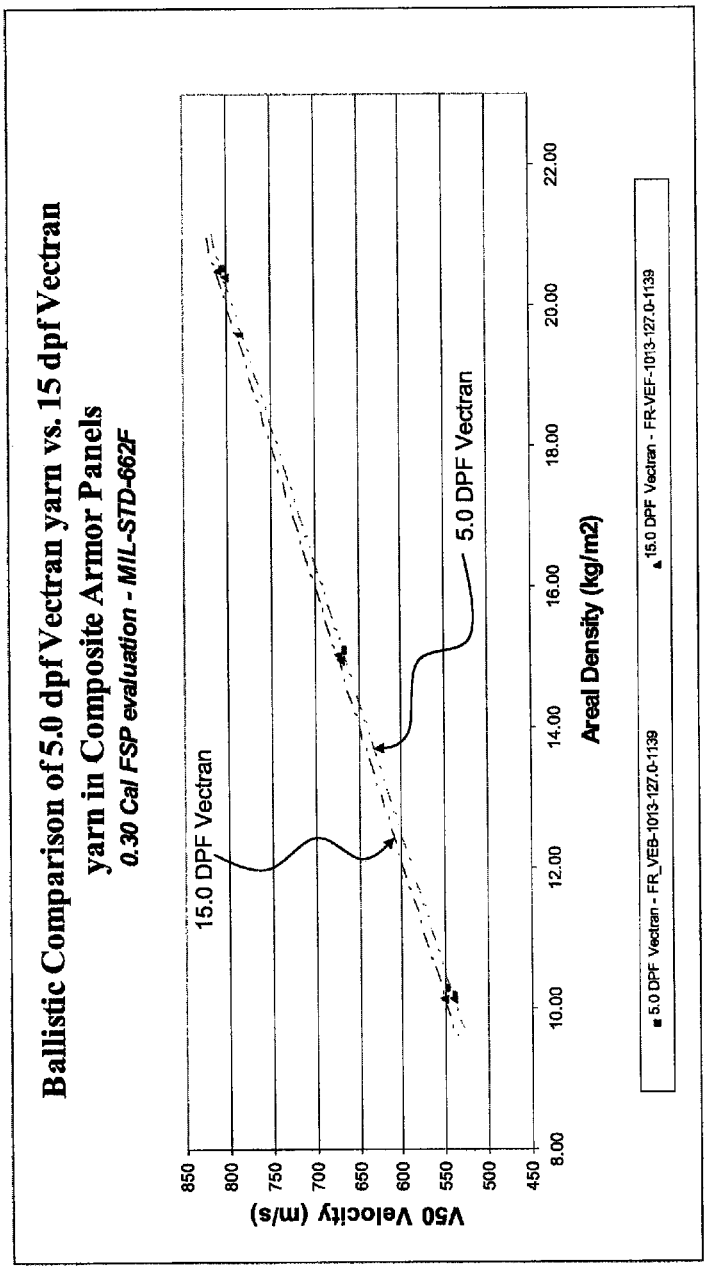
FIG. 5 is a comparison of ballistic-resistant composites made with 5.0 dpf vs. 15.0 dpf Vectran®.

As can be seen from FIG. 5, the exceptionally large 15.0 dpf, 3000 denier Vectran yarn (with a CA•dpf factor of 41.16, as will be described below) gave equivalent or even slightly better ballistics performance than the more expensive 5.0 dpf 3000 denier Vectran yarn.

For example, 28 layers of 5.0 dpf Vectran fabric pressed into an ballistic plate at an areal density 15.1 kg/m2, had an average V50 performance of 664 m/s, while 28 layers of the 15.0 dpf Vectran fabric pressed into an ballistic plate at the same areal density had an average V50 performance of 673 m/s, a difference of 8.5 m/s or 28 fps.

Figure 6:
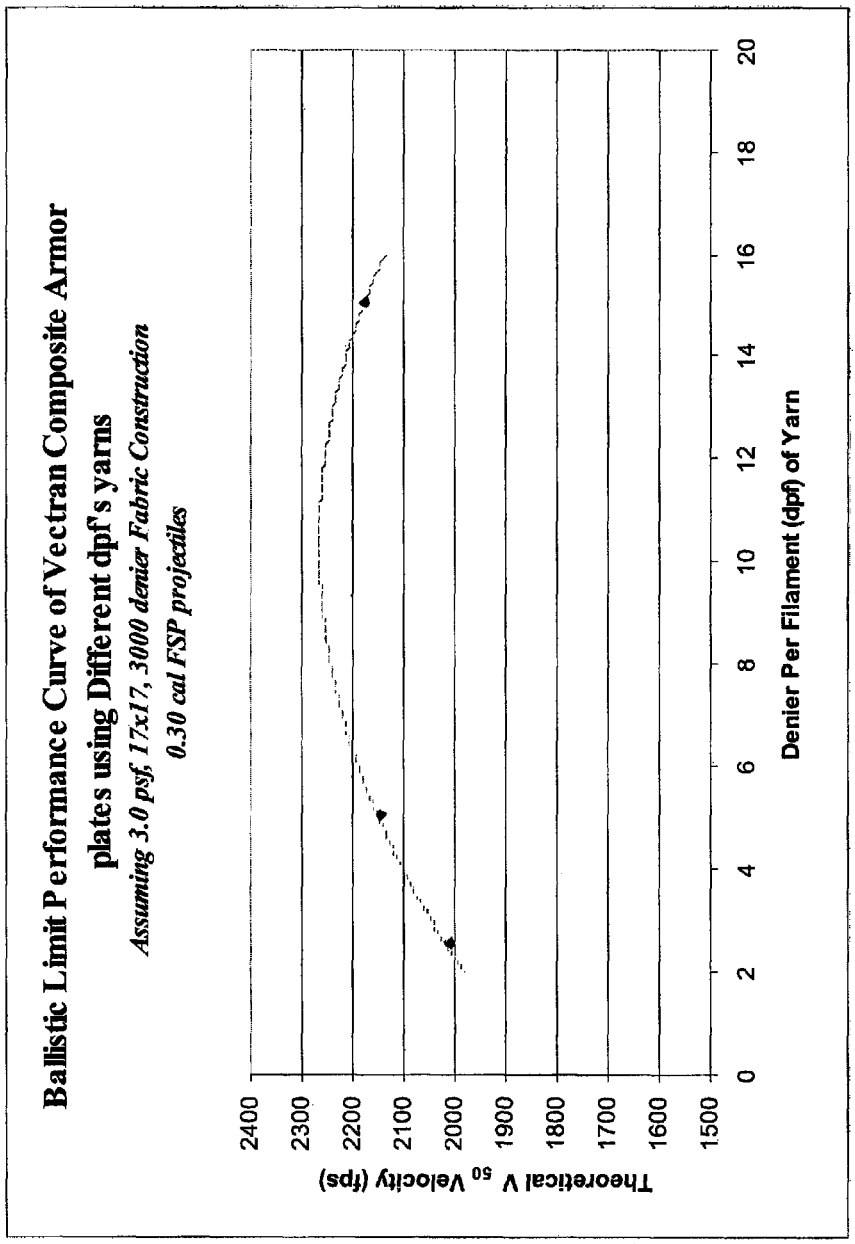
FIG. 6 is a curve of the theoretical performance of ballistic-resistant Vectran® composites at different dpf using a polymomial model.

This data was then used to generate the FIG. 6, which models a theoretical ballistic limit performance curve of 3.0 psf Vectran HT composite armor panels, constructed from different dpf Vectran yarns using a second order polynomial curve.

As can be seen from this theoretical second order polynomial curve, it appears the ballistic performance of a composite armor panel will tend to increase as the dpf is increased until an optimal dpf for the yarn is reached, after which the performance will tend to decrease as dpf is increased. The dpf will be yarn specific and is believed to be a function of the density of the yarn, along with other factors such as its tenacity, modulus and percent elongation to break.

In an attempt to model the impact of dpf across a wide variety of high performance ballistic yarns (i.e. aramids, HMPP, UHMWPE, Polyester-polyarylate (e.g. Vectran®), PBO, modified-aramids etc.) and carbon yarn, the data from the above Vectran testing was analyzed in comparison with commercially available dpf's and densities of high-performance yarns currently used in hard armor systems.

From this analysis, the inventor discovered that the commercially viable dpf range of high-performance yarns is primarily a function of the yarn's/polymer's density, with commercially available yarn dpf's being inversely proportional to base polymer's density cubed.

This is believed to make sense theoretically, because the lower the polymer's specific gravity, the larger the volume of yarn required per unit weight, and because density has been shown experimentally to be a key factor influencing the ballistic performance of high performance yarns.

Based on these findings, the inventor developed the following concept of a "Composite-Armor dpf factor" (CA•dpf), where CA•dpf is equal to the ratio of a yarn's individual yarn filament denier (dpf) to the inverse of the yarn's density cubed, which can be simplified to the product of (yarn dpf) times (yarn density^3), as shown in Equation 3:

$$CA \cdot dpf_{factor} = \frac{dpf_{yarn}}{\left(\frac{1}{(density_{yarn})^3}\right)} = dpf_{yarn} \times (density_{yarn})^3 \quad (3)$$

Based on available literature, some rigid and semi-rigid composite armor panels were analyzed and were discovered to have CA•dpfs of between 0.9 to 6.86, with the majority having a CA•dpf of between 4.5 to 6.7. For example, currently the largest CA•dpf yarn used in hard armor systems (while only a developmental level) is Vectran HT 2.5 dpf yarn with a specific gravity 1.40. This dpf, density combination results in a CA•dpf of 6.86.

According to some embodiments, the composites described herein include yarns which have a CA•dpf of greater than or equal to 7.0. According to other embodiments, the composites described herein include yarns which have a CA•dpf of greater than or equal to 15. According to other embodiments, the composites described herein include yarns which have a CA•dpf between 25 and 35. According to yet other embodiments, the composites described herein include yarns which have a CA•dpf of between 27 and 28.

According to some embodiments, the composites described herein may include yarns which have a CA•dpf of less than or equal to 85.

Figure 7:
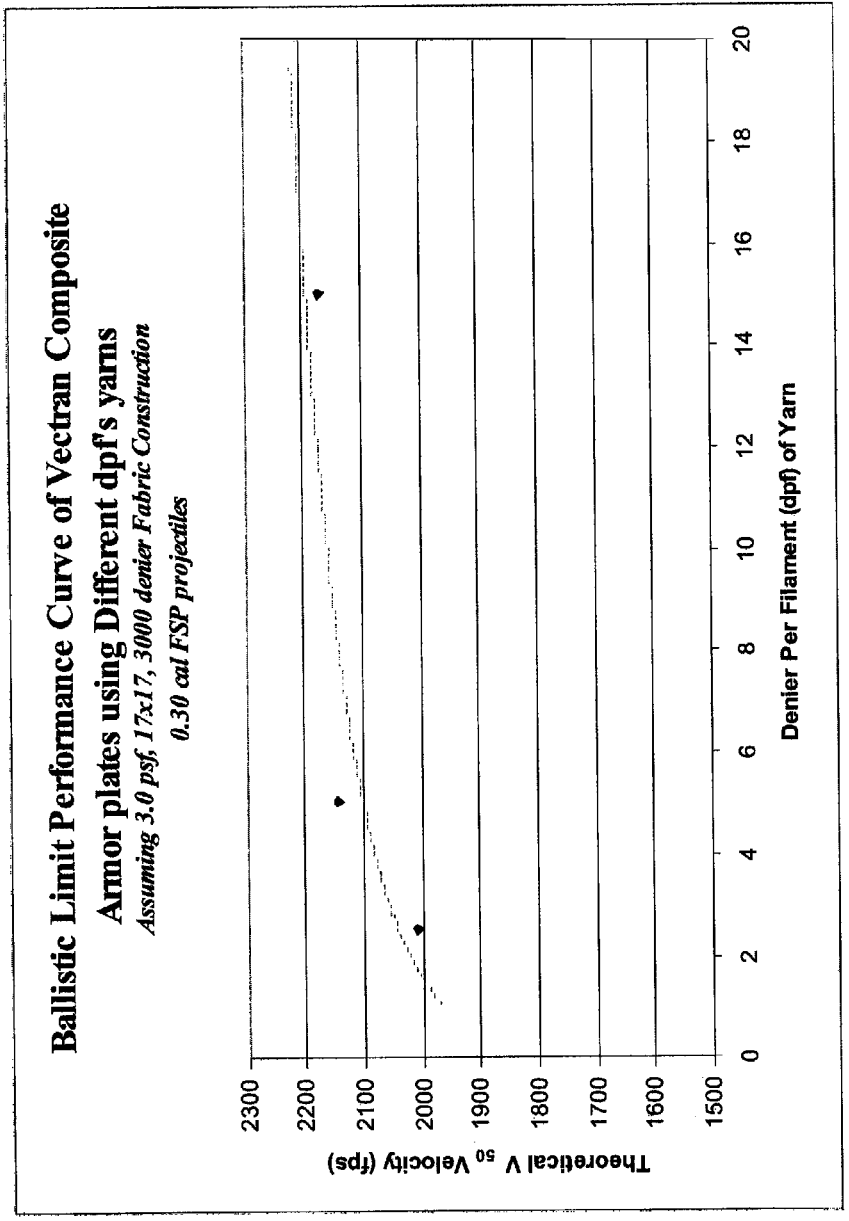
FIG. 7 is a curve of the theoretical performance of ballistic-resistant Vectran® composites at different dpf using a logarithmic model.

In some embodiments, a CA•dpf of 85 is proposed as an upper practical limit. However, such an upper limit has not been experimentally verified, and may be higher depending on whether the ballistic limit performance curve relating to dpf tends to be polynomial or logarithmic in nature. In particular, if the ballistic performance curve is logarithmic, higher dpf may be beneficial as generally shown in FIG. 7 (for example, polyester polyarylate (Vectran) with a dpf of 35 or more may provide good ballistic performance).

Based on experimental testing and using the second order polynomial model given above, the concept of the CA•dpf factor can be used to predict a theoretical commercially desirable dpf for any high performance yarn in a composite armor system (generally subject to the provision that the yarn's filaments can be produced at these large dpf's with equivalent tenacity, % elongation to break and tensile modulus to the smaller dpf yarns, which may be challenging in practice due to the yarn production and drawing requirements).

TABLE 1

Calculated CA-dpf Factors of Potential Ballistic Yarns

| Yarn type | Density (specific gravity) | Highest Commercially Available DPF used in composite armor | CA-dpf FACTOR (for Available DPF) | Predicted Commercially Desirable dpf |
|---|---|---|---|---|
| Para Aramid (Kevlar Twaron etc) | 1.44 | 2.25 | 6.72 | 9.35 |
| Para Aramid-Twaron micro filament | 1.44 | 0.84 | 2.51 | 9.35 |
| Modified Para aramid (AuTex HT) | 1.47 | 1.1 | 3.49 | 8.80 |
| Polyester polyarylate (Vectran) | 1.40 | 2.5 | 6.86 | 10.20 |
| HMPP (Innegra)** | 0.84 | 8.0 | 4.74 | 47.04 |
| HMPP (Innegra) literature | 0.91 | 8.0 | 6.03 | 37.00 |
| UHMWPE (Spectra Dyneema) | 0.97 | 5.4 | 4.93 | 30.55 |
| UHMWPE (Dyneema-microfilament) | 0.97 | 1 | 0.91 | 30.55 |
| PBO (Zylon HS) | 1.54 | 1.5 | 5.48 | 7.65 |
| PBO (Zylon HM) | 1.56 | 1.5 | 5.69 | 7.35 |
| M5 fiber* | 1.70 | 1 | 4.91 | 5.65 |
| Carbon | 1.76 | 0.6 | 3.27 | 5.10 |
| Nylon | 1.14 | n/a | n/a | 18.80 |
| Polyester | 1.38 | n/a | n/a | 10.50 |

*dpf is an estimation not reported in literature
**Measured density of HMPP fiber within a composite
n/a is not available since not widely used in composite armor For example, based on the Vectran data presented above, a commercially desirable dpf for Vectran yarn is about 10.2 dpf, while a commercially desirable dpf for Kevlar yarn (which is slightly more dense, with a specific gravity of 1.44) is about 9.35 dpf. For carbon yarn (which is relatively quite dense) a commercially desirable dpf is 5.1 dpf. It should again be noted that this commercially desirable dpf is solely based on density comparisons between yarns, and that tenacity, modulus, and % elongation to break will also be factors in determining this.

Turning now to Table 2, listed therein are CA•dpf factors for some of the example ballistic fabrics as described herein.

TABLE 2

Calculated CA-dpf Factors for Ballistic Examples

| Yarn type | Density | Yarn dpf | CA-dpf Factor of Yarn in Composite |
|---|---|---|---|
| Para Aramid (Kevlar Twaron etc) | 1.44 | 1.5 | 4.48 |
| Para Aramid (Kevlar Twaron etc) | 1.44 | 2.25 | 6.72 |
| Polyester polyarylate (Vectran) | 1.4 | 2.5 | 6.86 |
| Polyester polyarylate (Vectran) | 1.4 | 5 | 13.72 |
| Polyester polyarylate (Vectran) | 1.4 | 15 | 41.16 |
| HMPP (Innegra) fiber in composites** | 0.84 | 8 | 4.74 |
| HMPP (Innegra) fiber in composites** | 0.84 | 12.5 | 7.41 |
| HMPP (Innegra) fiber in composites** | 0.84 | 20 | 11.85 |

**Measured density of HMPP fiber within a composite

While the above description provides examples of one or more ballistic resistant composites, it will be appreciated that other ballistic resistant composites may be within the scope of the present description as interpreted by one of skill in the art.

The invention claimed is:
1. A rigid ballistic-resistant composite, comprising:
   a) a plurality of yarns arranged into a fabric, the yarns having a "Composite-Armor dpf factor" (CA•dpf factor) selected to provide improved ballistic performance; and
   b) a resin in contact with the fabric to form a rigid composite panel in which the yarns of the fabric are held in place by the resin, wherein CA•dpffactor is determined according to the following equation:

$$CA \cdot dpf_{factor} = \frac{dpf_{yarn}}{\left(\frac{1}{(S.G._{yarn})^3}\right)} = dpf_{yarn} \times (S.G._{yarn})^3,$$

wherein dpfyarn is a denier per filament of the yarns,
wherein S.G.yarn is a specific gravity of the yarns, and
wherein the yarns have a CA•dpffactor of less than 85, and include poly-para-phenylene terephthalamide fibers having a CA•dpffactor of greater than 6.72.

2. The rigid ballistic-resistant composite of claim 1, wherein the yarns have a CA•dpf$_{factor}$ between 6.75 and 9.35.

3. The rigid ballistic-resistant composite of claim 1, wherein the yarns comprise poly-para-phenylene terephthalamide fibers having a dpf$_{yarn}$ of greater than 2.25.

4. The rigid ballistic-resistant composite of claim 3, wherein the poly-para-phenylene terephthalamide fibers have a dpf$_{yarn}$ between 2.25 and 9.5.

5. The rigid ballistic-resistant composite of claim 1, wherein the resin is a thermosetting resin.

6. The rigid ballistic-resistant composite of claim 1, wherein the resin is a thermoplastic resin.

7. The rigid ballistic-resistant composite of claim 1, wherein the resin is selected from the group consisting of:
polyesters; polypropylenes; polyurethanes; polyethers; polybutadiene; polyacrylate; copolymers of ethylene; polycarbonates; ionomers; ethylene acrylic acid (EAA); copolymers;
phenolics; vinyl esters; PVB phenolics; natural rubbers; synthetic rubbers; polyethylene; and styrene-butadiene rubbers.

8. The rigid ballistic-resistant composite of claim 1, wherein the yarns comprise organic high-performance fibers.

9. The rigid ballistic-resistant composite of claim 1, wherein the yarns comprise industrial fibers.

10. A protective material comprising the rigid ballistic-resistant composite as claimed in claim 1, wherein the protective material is selected from the group consisting of: body armor; personal armor plates; personal armor shields; commercial vehicle armor; military vehicle armor; lightweight aircraft armor; ship armor; helmets; and structural armor.

11. The rigid ballistic-resistant composite of claim 1, wherein the yarns have a CA•dpf$_{factor}$ of about 9.35.

12. A rigid ballistic-resistant composite, comprising:
a) a resin; and
b) a plurality of yarns held in place by the resin,
wherein the yarns have a "Composite-Armor dpf factor" (CA•dpf$_{factor}$) determined according to $$CA \cdot dpf_{factor} = \frac{dpf_{yarn}}{\left(\frac{1}{(S.G._{yarn})^3}\right)} = dpf_{yarn} \times (S.G._{yarn})^3,$$

wherein dpf$_{yarn}$ is a denier per filament of the yarns,
wherein S.G.density$_{yarn}$ is a specific gravity of the yarns, and
wherein the yarns include poly-para-phenylene terephthalamide fibers having a CA•dpf$_{factor}$ of greater than 6.72.

13. The rigid ballistic-resistant composite of claim 12, wherein the yarns comprise poly-para-phenylene terephthalamide fibers having a dpf$_{yarn}$ of greater than 2.25.

14. The rigid ballistic-resistant composite of claim 13, wherein the poly-para-phenylene terephthalamide fibers have a dpf$_{yarn}$ between 2.25 and 9.5.

15. The rigid ballistic-resistant composite of claim 12, wherein the yarns have a CA•dpf$_{factor}$ of about 9.35.

* * * * *